Figure 1:
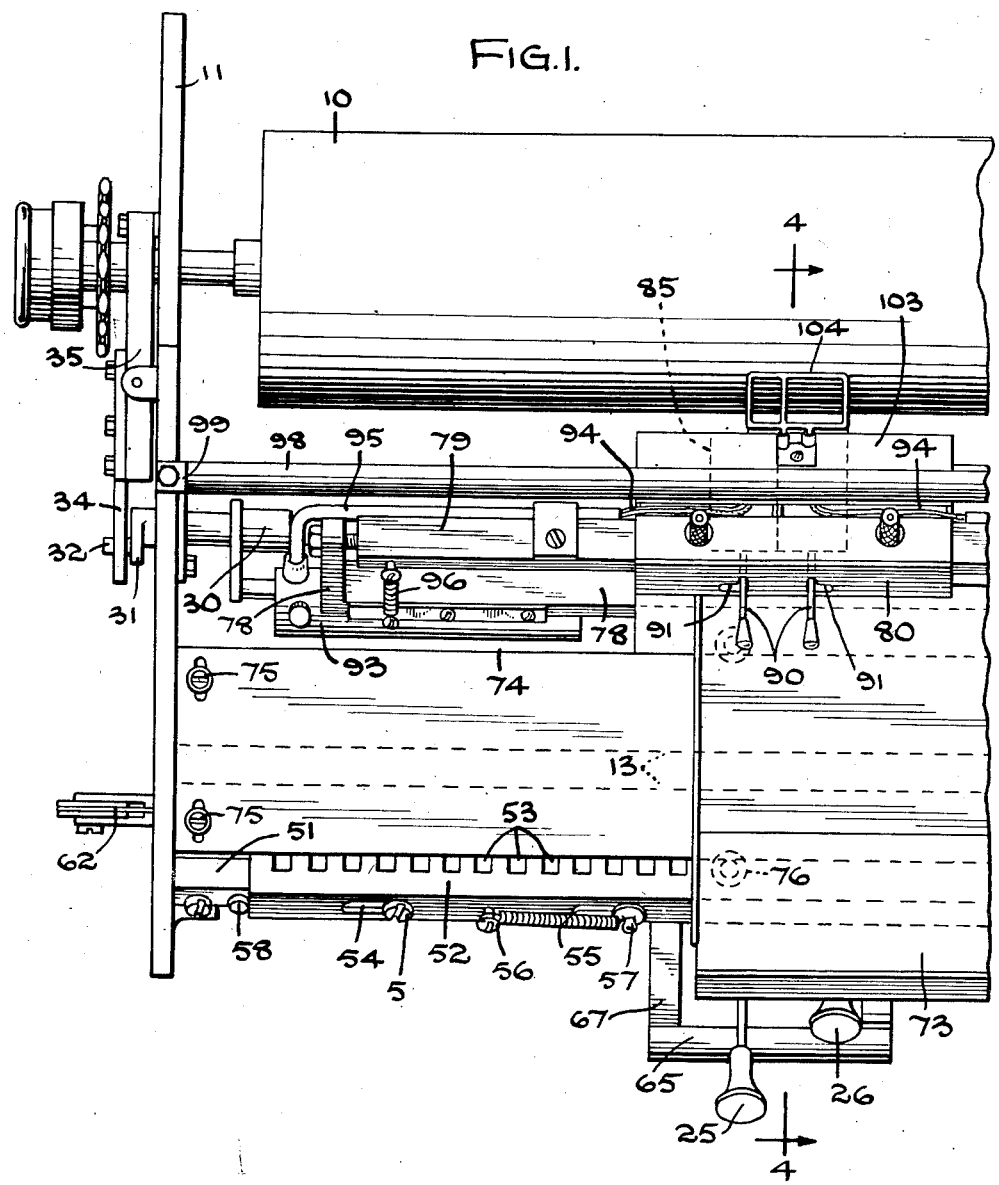

Jan. 11, 1955 R. M. FORD ET AL 2,699,114
MOISTENING MEANS FOR ROTARY DUPLICATING MACHINES
Filed Dec. 16, 1950 6 Sheets-Sheet 1

INVENTORS
Ronald Max Ford.
George Thomas Butler.
BY
Richardson Davis and Norden
their AGENTS.

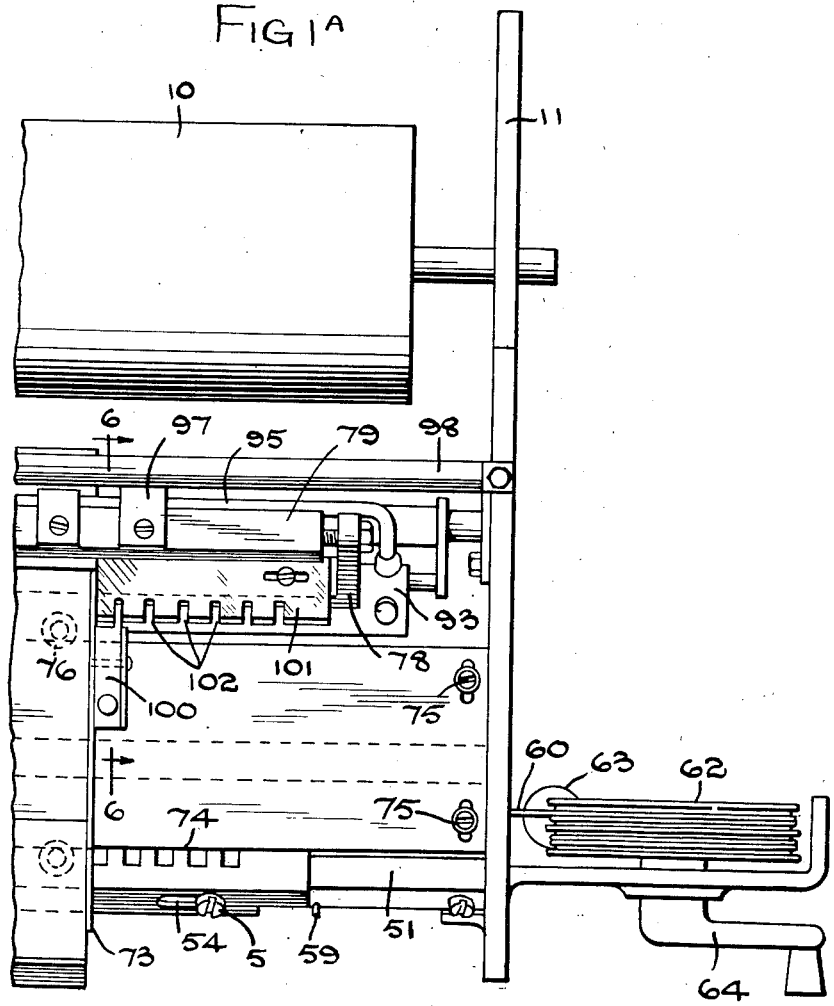

Jan. 11, 1955   R. M. FORD ET AL   2,699,114
MOISTENING MEANS FOR ROTARY DUPLICATING MACHINES
Filed Dec. 16, 1950   6 Sheets-Sheet 3

INVENTORS
Ronald Max Ford
George Thomas Butler
BY Richardson, David and Nordon
Their AGENTS.

Jan. 11, 1955 R. M. FORD ET AL 2,699,114
MOISTENING MEANS FOR ROTARY DUPLICATING MACHINES
Filed Dec. 16, 1950 6 Sheets-Sheet 4

INVENTORS
Ronald Max Ford
George Thomas Butler.
BY Richardson, Davis and Nordon
their AGENTS.

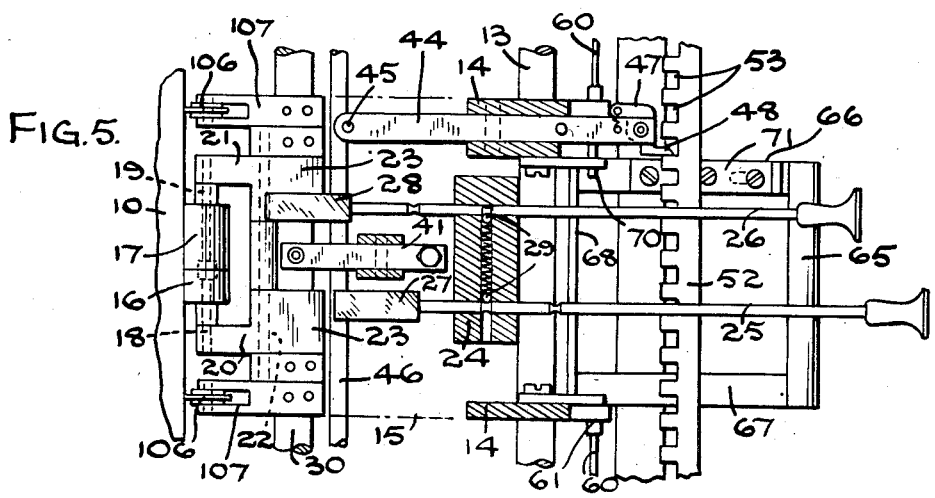

Jan. 11, 1955  R. M. FORD ET AL  2,699,114
MOISTENING MEANS FOR ROTARY DUPLICATING MACHINES
Filed Dec. 16, 1950  6 Sheets-Sheet 6

INVENTORS
Ronald Max Ford
George Thomas Butler
BY Richardson, David and Nordon
their AGENTS.

United States Patent Office 2,699,114
Patented Jan. 11, 1955

2,699,114

MOISTENING MEANS FOR ROTARY DUPLICATING MACHINES

Ronald Max Ford and George Thomas Butler, Sparkbrook, Birmingham, England; said Butler assignor to Frank R. Ford Limited, Sparkbrook, Birmingham, England, a British company Application December 16, 1950, Serial No. 201,094

Claims priority, application Great Britain December 30, 1949

2 Claims. (Cl. 101—132.5)

This invention relates to duplicating machines of the kind having a frame in which is mounted a cylinder to which is secured a master sheet having the matter to be reproduced in reverse, the machine also comprising moistening means for the copy sheets, a feed tray for the copy sheets, and a pressure roller to press the moistened copy sheets into contact with the master when the cylinder is revolved.

The invention is more particularly concerned with duplicating machines of this kind wherein a carriage is supported on the frame of the machine adjacent to the master cylinder and is movable along the length of the master cylinder to register with a selected circumferential zone thereof, and such carriage is provided with pressure roller means for cooperating with a selected zone of the master cylinder to form a printing couple and is provided with moistening means for moistening a corresponding zone on a copy sheet fed from a feed tray on said carriage through the printing couple so as to have transferred on to it the matter appearing on the selected zone of the master sheet attached to the master cylinder.

One object of the invention is to provide a duplicating machine of this kind of new or improved construction and more particularly embodying improved means for moistening the copy sheets, whereby moistening liquid is applied to an accurately delimited zone on each copy sheet as it is fed forwardly to the printing couple, thereby accurately confining the extraction of matter from the master sheet to the selected zone thereof which corresponds to the width of the pressure roller means provided on the carriage.

A more specific object of the invention is to avoid or reduce the possible application of an excess of moistening liquid to the leading portion of each copy sheet, or the first copy sheet of a series fed through the machine after a period of idleness, and which might otherwise occur due to an accumulation of moistening liquid on the element of the moistening means from which the moistening liquid is actually transferred to the copy sheet.

Figure 4:
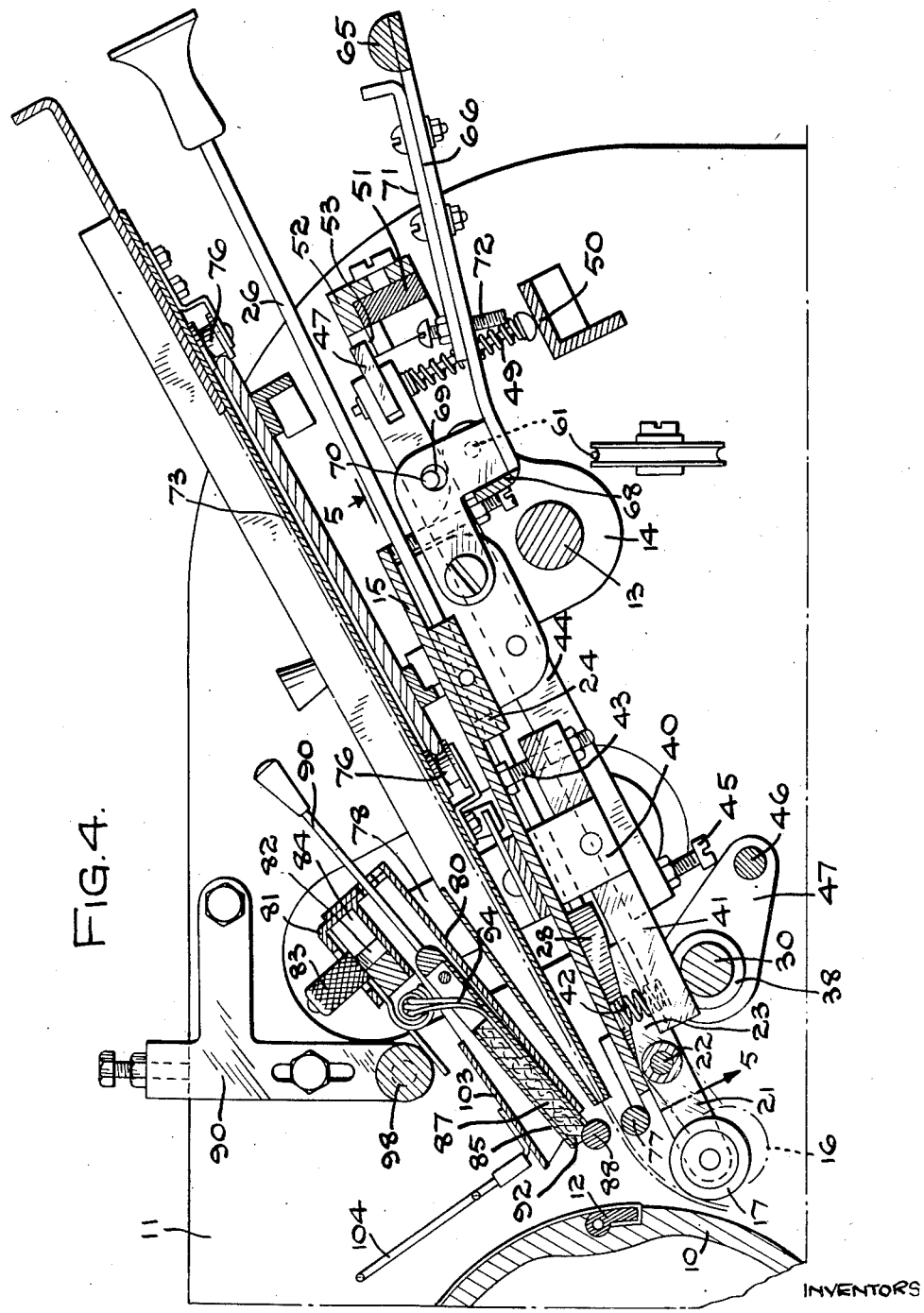
Figure 2:
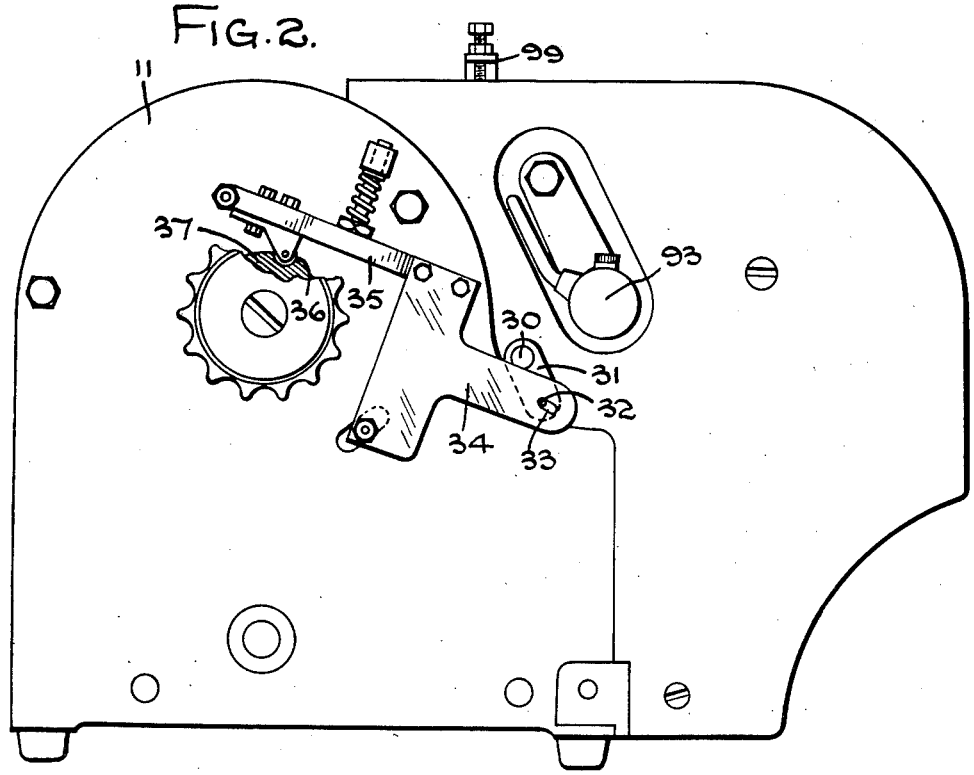
Figure 3:
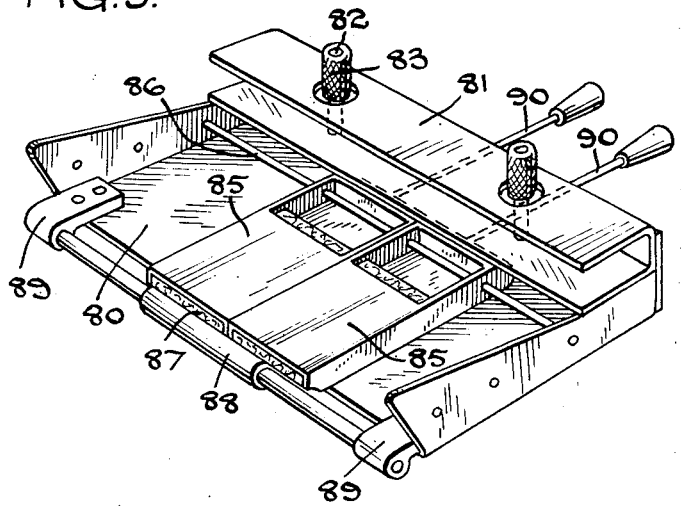
Figure 6:
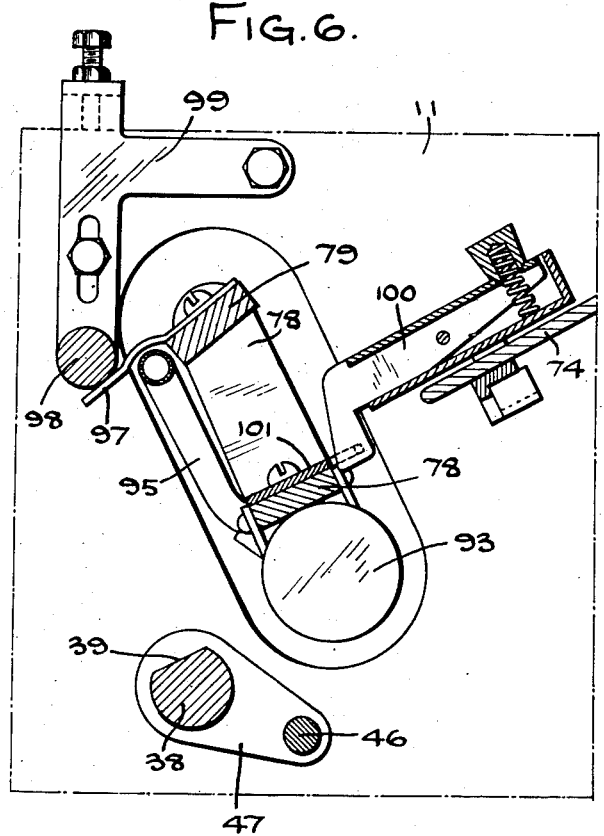
Figure 7:
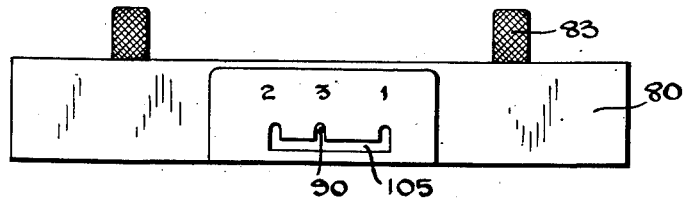

The invention will now be described with reference to the accompanying drawings illustrating by way of example a preferred embodiment thereof and wherein:

Figure 1 is a plan view.
Figure 1A is a fragmentary plan view of the opposite side of the machine from that shown in Figure 1.
Figure 2 is a side elevation.
Figure 3 is a detached perspective view showing the moistening pads.
Figure 4 is a section on the line 4—4 in Figure 1.
Figure 5 is a section on the line 5—5 in Figure 4.
Figure 6 is a section on the line 6—6 in Figure 1A.
Figure 7 is a detail of an alternative form of moistening means.

In the construction shown in the accompanying drawings the master cylinder 10 is supported rotatably between side frame members 11 and is provided with a master sheet clamp 12 and also main feed tray and moistening means for copy sheets for full width reproduction. The main feed tray and moistening means is not shown in the drawings as this forms no part of the present invention but the arrangement may be such as shown in the prior U. S. A. application Serial No. 766,797 filed August 6, 1947, now U. S. Patent 2,615,391.

The present invention provides for the reproduction of selected matter on the master sheet upon copy sheets or cards which may be of width considerably less than the width of the master.

A shaft 13 is fixed between the side frame members 11 and pivotally mounted upon this shaft are spaced brackets 14 which carry the element 15 which bears the pressure rollers at its forward end. In the construction shown two pressure rollers 16 and 17 (Figure 5) are provided, mounted respectively upon spindles 18 and 19 which are carried by levers 20 and 21. The levers 20 and 21 are pivotally mounted upon a spindle 22 carried by the element 15 and each lever has an arm 23 extending rearwardly.

A block 24 is fixed to the underside of element 15 and slidably mounted in said block are two rods 25 and 26, having wedges 27 and 28 at their ends which engage respectively with the arms 23 of levers 20 and 21. Each rod is provided with two spaced notches and spring loaded balls 29 engage said notches to retain the rods in either of their two positions. With the rod 26 in its forward position as shown, the pressure roller 17 is moved upwardly into the operative position shown in full lines in Figure 4.

In order to bring the pressure roller into contact with the master cylinder, the element 15 is automatically rocked by means of a cam bar 30 pivotally mounted in the frame of the machine and having at one end an arm 31 which carries a pin 32 projecting into a slot 33 in an arm 34 of the registration lever. A further arm 35 of of the registration lever carries a roller 36 which engages a notch in the registration disc 37 mounted upon the master cylinder shaft. Means are provided for altering the position of the master cylinder clamp in relation to the registration means when it is desired to change from selective to full width reproduction and there may be constructed as in the aforementioned U. S. A. application.

The cam bar 30 has an enlarged portion 38 provided with a flat 39 and a bracket 40 fixed to the element 15 has pivoted thereto a lever 41 which engages the part 38 so that when the cam bar 30 is rocked once during each revolution the flat 39 cooperates with the lever 41 to allow the element 15 to drop and thus bring the pressure roller out of contact with the master cylinder. A spring 42 is provided between the underside of the element 15 and one end of the lever 41 and at the other end an adjustable stop screw 43 is provided on the lever, having its head engaging the underside of the element 15.

The element 15 is capable of automatic step by step movement parallel to the axis of the master cylinder, the means for performing this being the same or similar to the arrangement shown for providing step by step motion of a secondary tray in the aforesaid U. S. A. application. The arrangement as herein shown includes a lever 44 pivotally mounted on the underside of the element 15 and having at one end a screw 45 which is adapted to be engaged by a bar 46 carried by a pair of arms 47 which are fixed on the cam bar 30.

The other end of the lever 44 has pivoted thereto a spring-loaded pawl 47 which has a nose 48. The pivot pin 49 of this pawl extends downwardly and its lower end engages an angle-section bar 50 extending between the side frames (Figures 4 and 5). Also extending between the side frames is an angle section bar 51 upon which is mounted another angle section bar 52 both of said bars having spaced notches 53. The bar 52 has slots 54 through which pass screw 5 entering the bar 51 and a spring 55 is attached between a pin 56 on the bar 52 and a pin 57 on the bar 51, the pin 57 passing through a slot in the bar 52. The bar 51 has two stop pins 58 and 59.

The element 15 is moved automatically by means of a cord 60 which is attached to the brackets 14 at 61 and passing over pulleys 62 and has a weight 63 attached thereto. The one pulley may also have a winding handle 64. When the master cylinder reaches the registration position the bar 46 allows the lever 44 to rock so as to bring the nose 48 of pawl 47 out of the notch on the bar 51 into the corresponding notch in the bar 52. The brackets 14 being slidable along the rod 13, the element 15 is then moved bodily one notch distance. When the cylinder moves out of the registration position the lever 44 is rocked to bring the nose 48 down into the new notch in bar 51 and the bar 52 is pulled by the spring 55 until it engages stop pin 58. Thus the element 15 is moved step by step parallel to the master cylinder.

Means are provided for moving the element 15 by hand comprising a hand bar attached to arms 66 and 67 which are pivotally attached to the underside of the element 15 and connected by a cross member 68. The arm 66 has a clearance hole 69 engaged by a pin 70 projecting from the lever 44, and also a slide 71 which is adjustable longitudinally along the arm 66, the slide 71 having a stop screw 72. In one position, when the hand bar 65 is down the stop screw 72 engages bar 50 and the nose 48 of pawl 47 is engaged in a notch on the bar 51 but when the slide 71 is moved to bring the stop screw 72 clear of bar 50, the hand bar 65 can be pressed down to take the nose 48 below bar 51 and allow the element 15 to be moved freely by hand.

A feed tray 73 is disposed above the element 15, said feed tray being mounted upon a plate 74 which extends between the side frames and is attached thereto by means of screws 75 passing through slots in the plate 74. The tray 73 has rollers 76 which engage the edges of the plate 74.

The element 15 carries, at its forward edge, a damping roller 77 and the moistening means are carried by the element 15 upon a U-shaped bracket 78 between the arms of which is pivotally supported a bar 79 which carries a tray 80.

The tray 80 has a channel shaped member 81 which fits over the bar 79 and which has two studs 82 provided with knurled nuts 83. Slots 84 in the bar 79 pass over the studs 82 and the nuts 83 secure the tray 80 to the bar 79.

The tray 80 carries two moistening members 85 each of which is pivotally attached at its rear to rod 86 extending between the sides of the tray 80. Each member 85 encloses between its upper and lower sides a pad 87 which is exposed at the forward end and at this end the pads engage a moistening roller 88 which is carried by brackets 89 on the tray 80.

It will be observed that the moistening roller 88 is an idle roller. Rotation occurs only when the upper surface of a copy sheet is pressed into contact with its lower extremity by the underlying roller 77, and consequently the transference of a film of moisture which is imparted to the surface of the roller 88 from one or both of the pads 87 is confined to the period during which this roller is actively driven by a copy sheet as aforesaid. In consequence of this there will be little or no accumulation of moistening liquid on the part of the roller 88 which is first engaged by the leading portion of a copy sheet when fed along the infeed path towards the printing couple defined by the master cylinder 10 and one or both pressure rollers 16 and 17.

Further, the interposition of the roller 88 between the ends of the pads 87 and the copy sheets required to be moistened thereby ensures that the moistening liquid is applied in a zone whereof the lateral boundaries are accurately delimited owing to the fact that the film of moistening liquid transferred to the operative surface of the moistening roller 88 does not tend to spread laterally. If the moistening pads 87 were to engage the copy sheet directly, a potentially greater body of moistening liquid would be presented at each actual point of application on the copy sheet, and, if the copy sheet were of an absorbent or semi-absorbent character a substantial degree of lateral spread might take place, which, by the above described arrangement is substantially entirely avoided owing to the fact that only a very small quantity of moistening liquid is presented at each point of application to the copy sheet.

Each member 85 has a rod 90 extending rearwardly therefrom and the rear wall of the tray has a pair of L-shaped slots 91. When the rod 90 is moved into the horizontal part of the slot the corresponding moistening member 85 is raised so that its operative surface 92 is brought out of contact with the moistening roller 88.

Liquid is supplied to the moistening members 85 from two tanks 93 by means of wicks 95 which pass through tubes 95, the tanks 93 being secured to the ends of the U-shaped bracket 78.

The bar 79 is acted upon by springs so that it floats in operation and resilient contact is maintained between the roller 77 and moistening roller 88. A spring 96 is connected between the bar 79 and the bracket 78 and a spring plate 97 secured to the top of bar 79 engages under a bar 98 which extends between the side frame members and is attached thereto by means of brackets 99 which are adjustable in the side frames to vary the pressure of the bar 98 on the spring plate 97.

The feed tray 73 is provided with a spring loaded latch arm 100 and a bar 101 having notches 102, which can be engaged by the arm 100, is adjustably mounted on the bracket 78, so that the feed tray can be locked in relation to the element 15.

In order to enable the operator to align the element 15 in the correct position for reproducing selected portions of the master sheet, the tray 80 is provided with a cover 103 upon which is mounted a sight 104 which is divided to correspond with the axial lengths of the pressure rollers 16 and 17.

With this form of the apparatus, either or both of the pressure rollers 16 and 17 may be used according to the number of lines it is desired to take from the master sheet for each copy sheet or card. Either or both of the moistening members 85 is put in the operative position according to setting of the pressure rollers 16 and 17. In this arrangement the length of roller 17 is twice the length of roller 16.

In an alternative arrangement, referring to Figure 7, only one moistening member 85 is provided, and the tray 80 at the rear has an index slot 105 which provides three positions for the member 85. In No. 1 position a third of the pad 87 is in operation, in No. 2 position two thirds and in No. 3 position the whole of the pad 87 is in use.

In order to prevent the copy sheet or card from skewing sideways when passing between the master cylinder and pressure roller, a pair of guide wheels 106 are provided on arms 107 which are mounted on the element 15.

What we claim then is:

1. In a duplicating machine of the kind having a frame, a master cylinder mounted rotatably therein adapted to carry a master sheet from which matter may be reproduced upon moistened copy sheets brought into contact therewith under pressure and a carriage supported on said frame adjacent to said cylinder and movable along the length of the cylinder to register with a selected circumferential zone thereof; the provision of means for reproducing selected matter from said master sheet on fractional width copy sheets fed to said cylinder from said carriage, comprising in combination, pressure rollers on said carriage registering with separate circumferential zones of said cylinder and movable individually into and out of operative positions in which they are adapted to co-operate with said cylinder to form printing couples, structure on said carriage defining a feed path for fractional width copy sheets to said printing couples, and moistening means comprising roller transfer means including a supporting member and at least one idle transfer roller journalled in said supporting member, moistening pad means registering with zones of said roller transfer means in correspondence with said pressure rollers, means for moving said pad means and said roller transfer means relatively to confine co-operation between them to zones corresponding to the operative pressure rollers, and a moistening pressure member mounted on said carriage parallel to said transfer roller and spaced therefrom in a direction transversely of said transfer roller axis to lie on the side of the in-feed path opposite to that on which said transfer roller lies, and means for moving said moistening pressure member and said pressure rollers when in their operative positions relatively to their associated transfer roller means and master cylinder respectively into and out of co-operation therewith in each case thereby applying feed motion to copy sheets nipped between the master cylinder and pressure roller and driving the transfer roller for a period confined to engagement of a copy sheet therewith under pressure from said moistening pressure member.

2. In a duplicating machine of the kind having a frame, a master cylinder mounted rotatably therein adapted to carry a master sheet from which matter may be reproduced upon moistened copy sheets brought into contact therewith under pressure, and a carriage supported on said frame adjacent to said cylinder and movable along the length of the cylinder to register with a selected circumferential zone thereof, the provision of;

means for reproducing selected matter from said master sheet on fractional width copy sheets fed to said cylinder from said carriage, comprising in combination pressure rollers on said carriage registering with separate circumferential zones of said cylinder and movable individually into and out of operative positions in which they are adapted to co-operate with said cylinder to form printing couples, structure on said carriage defining a feed path for fractional width copy sheets to said printing couples, and moistening means comprising roller transfer means including a supporting member and at least one idle transfer roller journalled in said supporting member, moistening pad means registering with zones of said roller transfer means in correspondence with said pressure rollers, means for moving said pad means and said roller transfer means relatively to confine co-operation between them to zones corresponding to the operative pressure rollers, and a moistening pressure member mounted on said carriage parallel to said transfer roller and spaced therefrom in a direction transversely of said transfer roller axis to lie on the side of the in-feed path opposite to that on which said transfer roller lies, an element on said carriage operatively connected with both said moistening pressure member and said pressure rollers, means for moving said element in response to rotation of the master cylinder from a registration stop position to move said moistening pressure member and said pressure rollers when in their operative positions relatively to their associated transfer roller means and master cylinder respectively into and out of co-operation therewith in each case, thereby applying feed motion to copy sheets nipped between the master cylinder and pressure roller and driving the transfer roller for a period confined to engagement of a copy sheet therewith under pressure from said moistening pressure member.

References Cited in the file of this patent

UNITED STATES PATENTS

| | | |
|---|---|---|
| 1,969,155 | Schultz | Aug. 7, 1934 |
| 1,988,056 | Storck | Jan. 15, 1935 |
| 2,034,208 | Ritzerfeld | Mar. 17, 1936 |
| 2,174,208 | Ford | Sept. 26, 1939 |
| 2,286,402 | Ford | June 16, 1942 |
| 2,360,015 | Rockhill | Oct. 10, 1944 |
| 2,362,895 | Ford | Nov. 14, 1944 |

FOREIGN PATENTS

| | | |
|---|---|---|
| 421,352 | Great Britain | Dec. 19, 1934 |